ERROR DETECTION AND CORRECTION EQUIPMENT

Filed Oct. 20, 1965 6 Sheets-Sheet 1

Inventor
GEOFFREY C. ROWLEY
By [signature]
Attorney

ERROR DETECTION AND CORRECTION EQUIPMENT

Filed Oct. 20, 1965 6 Sheets-Sheet 2

Inventor
GEOFFREY C. ROWLEY
By [signature]
Attorney

ERROR DETECTION AND CORRECTION EQUIPMENT

Filed Oct. 20, 1965 6 Sheets-Sheet 3

Inventor
GEOFFREY C. ROWLEY

By [signature]
Attorney

Inventor
GEOFFREY C. ROWLEY
By [signature]
Attorney

Inventor
GEOFFREY C. ROWLEY
By [signature]
Attorney

Inventor
GEOFFREY C. ROWLEY
By [signature]
Attorney

United States Patent Office
3,474,412
Patented Oct. 21, 1969

3,474,412
ERROR DETECTION AND CORRECTION EQUIPMENT

Geoffrey Charles Rowley, London, England, assignor to International Standard Electric Corporation, New York, N.Y., a corporation of Delaware Filed Oct. 20, 1965, Ser. No. 498,906
Claims priority, application Great Britain, Nov. 16, 1964, 46,529/64
Int. Cl. G08b *29/00;* G06f *11/00*
U.S. Cl. 340—146.1 3 Claims

ABSTRACT OF THE DISCLOSURE

The arrangement provides error detecting and correcting code in conjunction with an independent check in various parts of a computer. In a serial data operation, duplication of transfer equipments and simple comparison between the duplicate equipments provides a satisfactory independent check on the error correction equipment. In parallel data systems the inclusion of a parity bit in addition to the Hamming code again provides a satisfactory check on the error correcting equipment.

Figure 1:
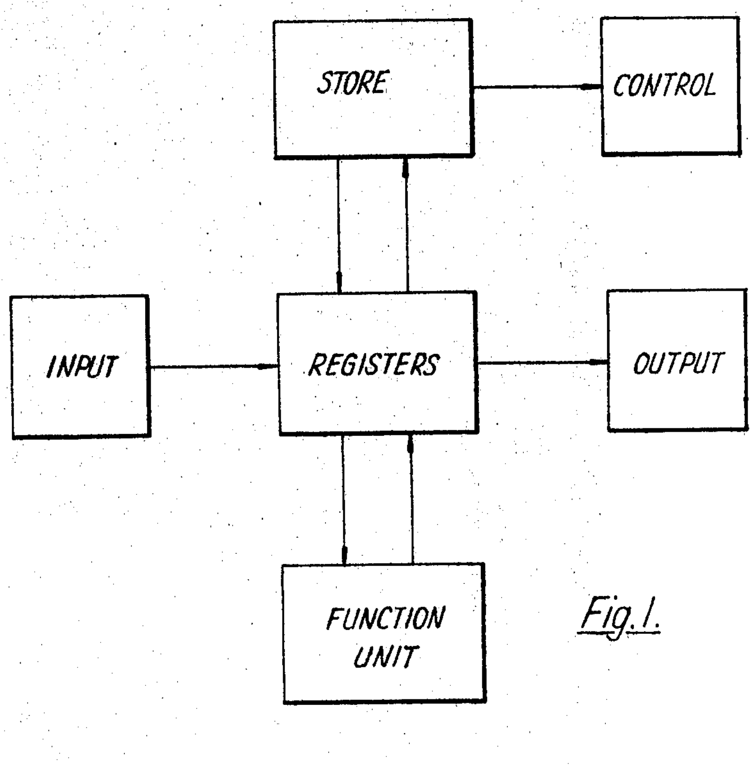

This invention relates to data processing equipment, and in particular to electronic digital computers.

The design of data processing equipment is directed towards one or more specific requirements, such as speed of operation, data handling capacity, flexibility of operation, size and reliability. The development of any of the first four requirements is usually consistent with an increased reliability problem. Any increase in the number of components for example means that more components are liable to failure. Furthermore any increase in components leads to increased difficulty in fault diagnosis. And it is by no means certain that additional components incorporated in the interests of increased reliability for example in the form of checking events will themselves contribute to the overall reliability.

A digital data processing equipment such as a computer comprises three essentials:

(1) Data transfer from one section of the equipment to another.
(2) Data processing function equipment, i.e. adding, translating, checking.
(3) Data storage.

It will be assumed for the purposes of this specification that in any portion of a data processing equipment not more than one fault will appear at any one time. Experience has indicated that this is a reasonable assumption to make, providing that rapid rectification is possible and also that if such single faults can be averted or circumvented the operation of the equipment need not be immediately interrupted. This last point is based on the assumption that faults are comparatively infrequent and therefore the probability of a second related fault occurring before the end of the current program may be small, and that an equipment shut-down can thereby be deferred.

According to the invention there is provided a data processing equipment including means for transferring data together with associated error detection and correction information from a source to a destination, the transfer means including means for generating independent error detecting and correcting information relating to the data, means for comparing the independently generated error detection correction information with that received from the source, and further separate data checking means independent of the error detection and correction information arranged to control the correction, if any, of the data transferred to the destination in the event of there being a discrepancy between the error detection and correction information received from the source and the independently generated error detection and correction information.

One embodiment of the invention provides duplicated sources, destinations and transfer means, each transfer means including means for generating independent error detecting and correcting information and means for comparing that information with the error detecting and correcting information received from the source, means for comparing the data received from the duplicate sources and means for inhibiting any error correcting function in a destination if comparison of the data from the duplicate sources fails to reveal any discrepancies.

In an alternative embodiment in which data is transferred in a parallel mode from a single source to a single destination the independent check takes the form of additional error detecting information transferred with the data, means for generating separate checking information from the data transferred from the source, means for comparing the independently generated checking information with that accompanying the data and means for inhibiting any error correcting function initiated by the comparison of the error detecting and correcting information received with the data and that generated locally. In the case of binary digital data the independent checking information can be a simple parity bit. It has been stated above that the invention is concerned with the appearance of a single fault in an equipment. In the case of binary data such a fault will lead to one error in the data and this can be detected by a parity bit. For error correction purposes a larger number of bits additional to the original data are required. Such bits are termed redundant, and form the basis of error detecting and correcting codes such as a Hamming code.

The Hamming type of code provides redundancy in such a way that any single error within a coded representation can be detected, and the incorrect digit position indicated. This is achieved by spacing the coded representations sufficiently far apart from each other, for any single digit change to be unambiguously recognisable as a variant of the original. Providing that an error does not occur in another digit position, therefore, the incorrect representation is a perfectly adequate means of conveying the required information.

Supposing that a situation exists where a data or instruction word is being transferred from a source to a destination and back to the source again without modification in any way, and that a fault is causing a particular bit in the word to become incorrect. After the first transfer, the word has a single incorrect digit, but, thereafter, remains unchanged, and, at any time, can be converted back into its correct form by means of suitable error-correcting circuits. This concept can clearly be extended to include larger sections of logic between which data is transferred: providing that there is no modification of the data involved, then a single error can be tolerated even if it is perpetuated through the logic.

This feature of coded data is a very useful one, and can be exploited in limiting the number of places in a system where error-correcting circuits must be used. The larger the size of the block of logic in association with the error-correcting circuits, however, the greater is the probability of more than one error occurring within it, and this factor must be considered. Another factor is the relative difficulty of localising faults: the error-detecting circuit will indicate which bit in the word is in error, but if a large amount of logic is associated with the detection circuit then the position of the fault is less well defined than if the amount of logic is smaller. This latter factor can be offset to some extent by the method of construction used: if the circuits proper to one bit are grouped on a few circuit cards, then fault location is simplified.

Figure 2:
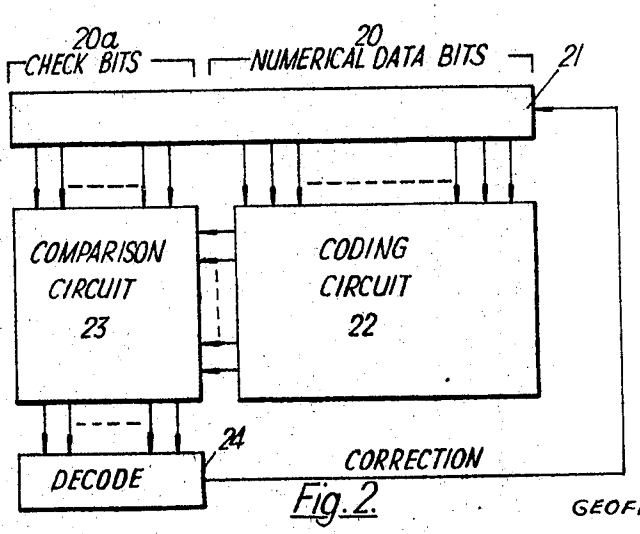
Figure 3:
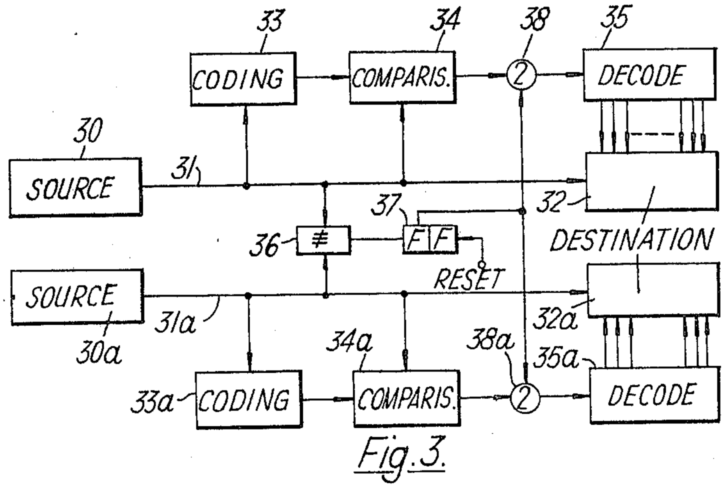
Figure 4:
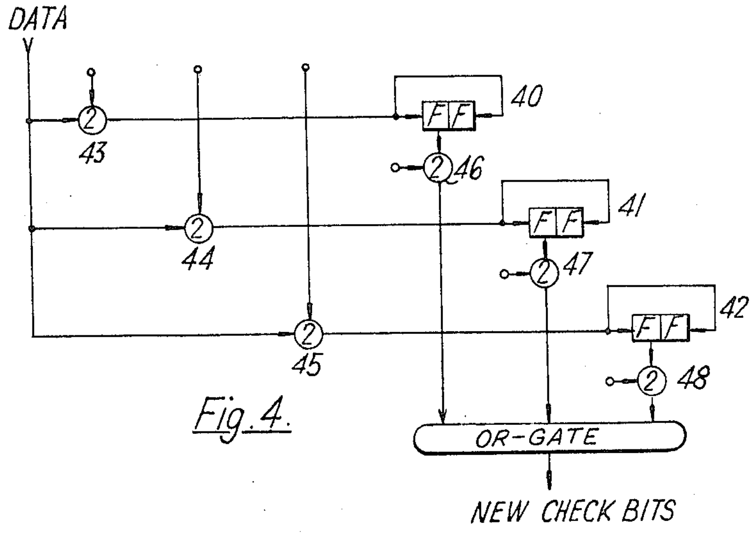
Figure 5:
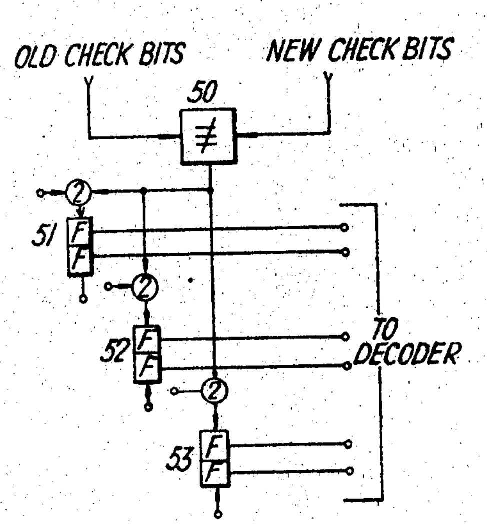
Figure 6:
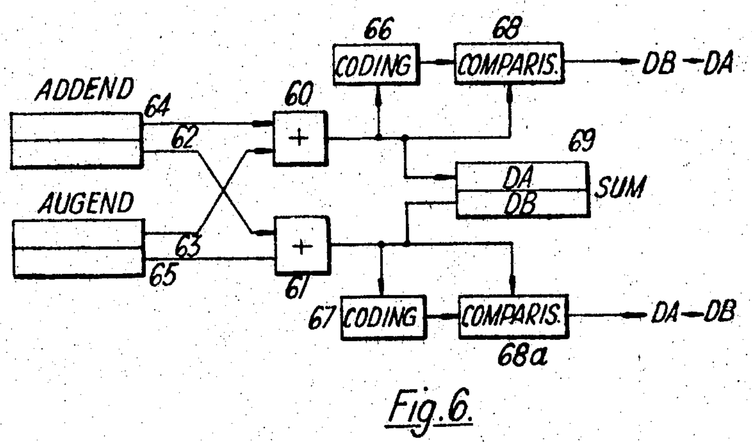
Figure 7:
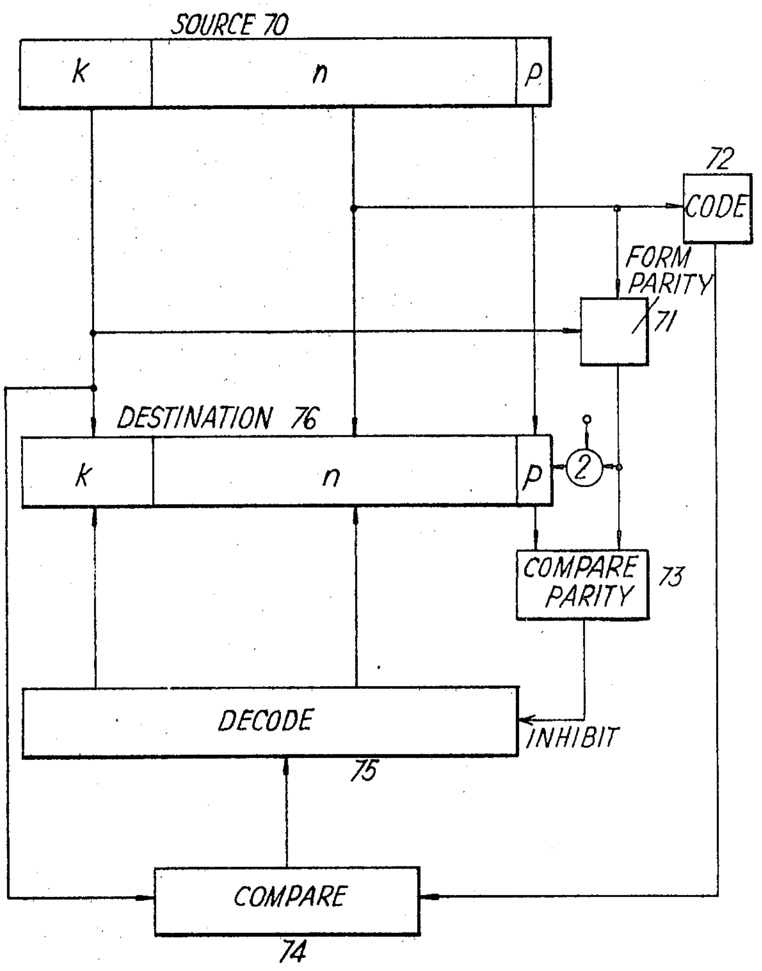
Figure 10:
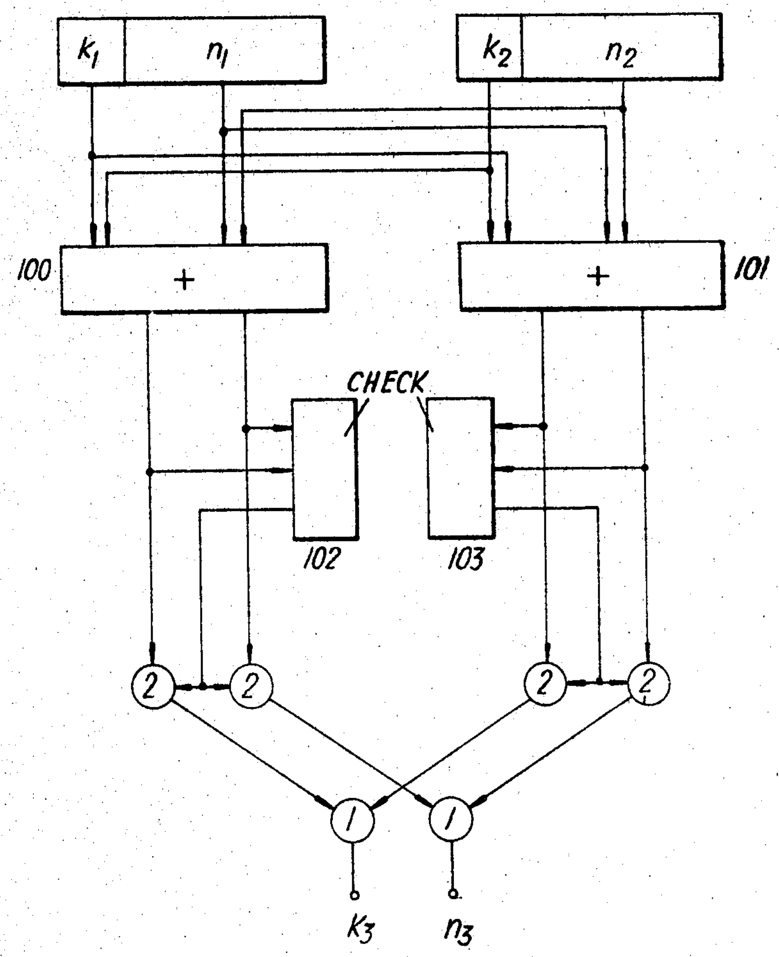
Figure 8:
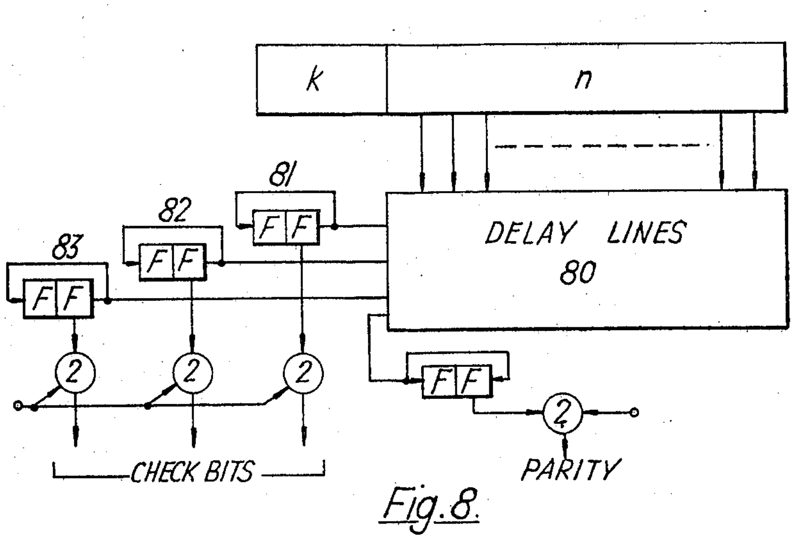
Figure 9:
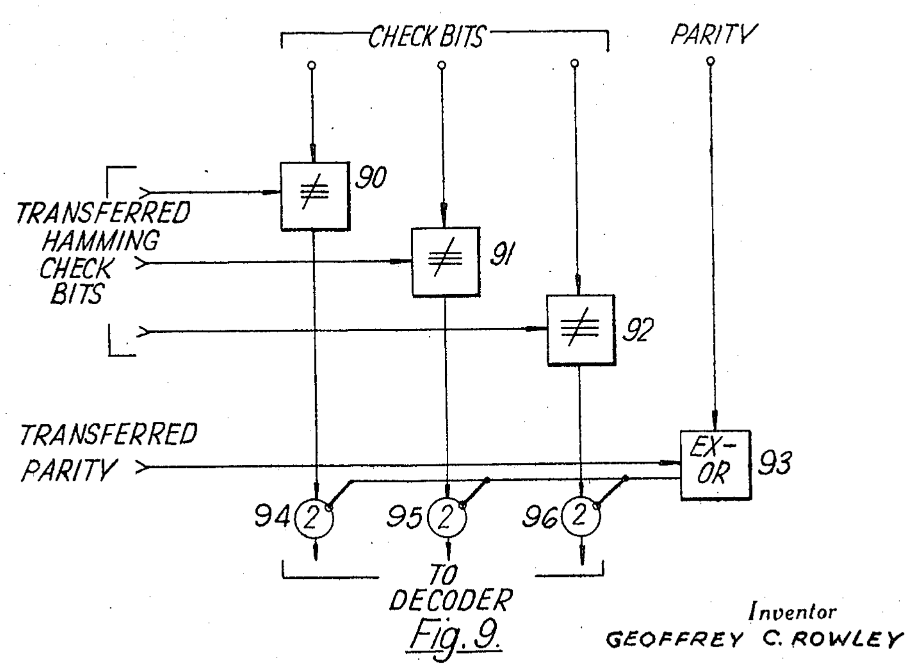

The above and other features of the invention will now be described with reference to the drawings accompanying the specification which illustrate embodiments of the invention, and in which FIG. 1 illustrates the flow of data in a typical electronic computer, FIG. 2 illustrates schematically the process of correction applied to a Hamming type of code, FIG. 3 illustrates schematically a serial data processing equipment embodying duplicate channels with independent checks, FIG. 4 illustrates a serial coding circuit, FIG. 5 illustrates a comparison circuit, FIG. 6 illustrates a serial arithmetic scheme, FIG. 7 illustrates schematically a parallel data processing equipment embodying an independent parity check, FIG. 8 illustrates a coding arrangement for parallel data, FIG. 9 illustrates a comparison arrangement for parallel data, and FIG. 10 illustrates an arrangement for checking a parallel data addition.

A typical computer central processor is shown in FIGURE 1 comprising a store, control unit, registers, function unit, input and output channels. Data enters the system through the input channel from paper tape, punched cards, magnetic tape, or as digitized on-line data, and is assembled, as necessary, in an input register into computer words. The assembled data will then, normally, go to the store. During processing, instructions will be taken from the store to the control unit, the function digits being decoded to specify the function to be carried out, and the address digits specifying the source of the data or the next instruction. The data flows to the registers—accumulator, multiplier registers and so on—and is operated upon by the function unit, intermediate results being fed back into store. Finally, results are fed to the output register to be split into suitably sized groups of digits for the selected output device. The lines in the figure indicate the paths along which data flows.

The points in the system at which data is converted from one form to another are:

(a) at input, where the incoming data is assembled into computer words;
(b) in the control unit, where instructions may be modified and subsequently split into function and address parts;
(c) in the store, where the address is decoded;
(d) in the function unit, where sums, products, and so on are formed;
(e) at output, where the computer words are split into output digit groups.

It appears that elsewhere in the system, any single error in data transfer can be tolerated, providing that the probability of fault occurrence is not too high. When data is fed to any of the five points in a system listed above, then corrections must be applied to ensure its validity before conversion takes place to another form.

As far as data transfers are concerned, therefore, it appears that as few as five error-correcting circuits might be adequate. Other parts of a system requiring separate protection include:

(a) input;
(b) store current sources, address decode and co-ordinate select circuits;
(c) the control generally, apart from the control register, including instruction modification facilities;
(d) the function unit;
(e) power supplies;
(f) pulse sources and timing; and
(g) output.

Parity checking codes of the Hamming type are an attractive means of providing redundancy in digital equipment because they are economical in the number of extra bits required, and can be arranged with the checking and numerical parts of a word quite separate from each other.

They are suitable for the protection of data during transfer from one part of an equipment to another, particularly if this is parallel in nature. Serial transfers require duplication of the transfer route to provide full protection but a parity check can also be applied to the data flowing along these channels to indicate any failure.

Before comparisons can be made between the use of parity checking codes and other means of introducing redundancy, it is necessary to assess the complexity of the equipment needed with such codes to test, and, if necessary, to correct the data after a transfer or arithmetic operation. This specification describes possible methods of making such tests and corrections and indicates how much extra logic is needed.

The steps to be gone through in correcting any errors with a Hamming code are:

(a) form a new check digit combination from the transferred numerical data,
(b) compare the new check digit combination with the one already associated with the data, producing a pattern of differing corresponding check bits.
(c) decode the pattern of differing check bits to indicate the position of any fault in the word, and
(d) correct the transferred word, as necessary.

FIGURE 2 shows, in block schematic form, the separate stages in the correction operation. The complete code comprises a number of numerical data bits 20 and a lesser number of check bits 20*a*. The check bits have previously been derived in respect of the numerical bits and near a specific relationship to the latter. It is now necessary to check that the information stored in the register 21 is correct. The numerical bits 20 are therefore applied to a coding circuit 22 in which an independent set of check bits are generated. Both these check bits and the original check bits 20*a* are then fed to a comparison circuit 23, and any discrepancy between the two sets of check bits indicates an error. In the case of a Hamming code this discrepancy can be decoded in the decoder 24 to provide error correcting information which is then used to correct the erroneous digit in the register 21.

A scheme is described in which two channels each carry identical serial words with associated error-correcting digits. A complete failure of one channel is overcome since the other can be shown to be correct by its own check bits. The channel which loses all its data can be restored by suitable cross-coupling from the other, so that the complete loss of one channel as well as transient faults affecting either or both words can be corrected.

If this scheme is used, the problem arises of how best to organise the checking, comparison, decode and correction procedures. Data will be transferred to the destination on two channels and may reach the destination incorrectly due to a fault in the source of fault during transmission or a fault in the destination itself. Faults due to the source and the transfer operation can be checked whilst the data is flowing to the destination, but faults in the destination require further time for checking after the transfer is completed. It seems reasonable, therefore, to limit the use of the check to correct faults caused by the source and the transfer operation and to wait until the destination itself becomes a source before correcting faults within it.

If one channel has a fault which causes a continuous train of zeroes or ones to be transmitted, this must be recognised as a fault condition. The choice of error-correcting code must be made so that these conditions are recognised as completely erroneous and the data on the other channel, after correction of any errors it may itself have, used to replace the completely erroneous data.

The form of the destination must now be specified so that methods of making the necessary corrections can be considered. Since the destination is essentially serial in nature, care must be taken to ensure that a single fault does not cause all of the data to be lost. The separate identity of the two channels must be preserved as far as possible through the equipment, and, in fact, the data must be stored twice in separate places to cover such an eventuality. The destination comprises, therefore, two storage devices, each of which is set by one of the two channels, both devices storing identical data when the equipment is operating correctly.

Corrections made to the data in the destinations are of two types, the correction of individual errors and the replacing of a completely erroneous word by the other one. Separate sets of correction lines to each of the two storage devices are desirable so that individual faults can be independently corrected in the two storage devices. Replacing one word by the other could be effected as a parallel transfer of data, but would involve complex gating arrangement between the two storage devices. It is simpler to make the transfer serially when such a fault occurs, either by arranging to feed both output channels from the storage device containing the correct data, or by cycling both devices immediately and transferring the correct contents into both. The first method involves a memory device to store the fact that this kind of transfer is required whenever the storage device is called as a source. The second can be dealt with immediately with only a slight slowing down of the overall speed of operation, and appears to be preferable.

Apart from the correction of one register by the contents of another, the two channels are completely independent, each having its own source, channel, checking circuit and destination. If a fault occurs in the checking circuits, then three possibilities arise:

(a) nothing is affected,
(b) a correct transfer is indicated as being incorrect,
(c) an incorrect transfer is indicated as being correct.

The first possibility needs no further comment. After the correction operation the second results in one of the two parts of a destination containing a number whose associated check bits are incorrect for that number: either the number will be incorrect and disagree with that in the other storage device, or the check bits will be incorrect and disagree with their counterparts. The third possibility implies the presence of two faults and is thereby excluded from the present discussion. When the number is made incorrect but the check bits remain correct, then the next transfer away from the destination containing the number will make the necessary correction. When the number remains correct but the check bits are made incorrect, then the next transfer will result in the number being made incorrect also. Great care must be taken, therefore, when correcting check bits to ensure that the correction is a valid one. Redundancy can be introduced into the checking and correction circuits to avoid false correction of a number, but the presence of two identical checking and correction channels indicates that the existing redundancy can be exploited. Assuming that only one fault exists in the transfer circuits; if this is in one of the check circuits then both of the numbers with their associated check bits will be correctly transferred. This can be confirmed by a not-equivalent circuit across the two channels with an associated flip-flop to remember any disagreement. This combination must be redundant, and an indication from it that both numbers are in complete agreement can be used to inhibit any corrections, the gating for this purpose also being redundant.

FIGURE 3 shows the complete scheme in which duplicate sources 30 and 30*a* transfer data over separate channels 31, 31*a* to duplicate destinations 32, 32*a*. Each channel incorporates error detecting and correcting equipment as previously described and illustrated in FIG. 2 namely a coding circuit 33, 33*a* to generate independent Hamming type check bits, a comparison circuit 34, 34*a* to compare these bits with those accompanying the data from the source, and decoding circuits 35, 35*a* to decode any differences in the two sets of checking bits and apply the necessary correction to the data stored in the destination. At the same time the data on each channel is compared with the data on the other channel and if no discrepancy is discovered by the comparison circuit 36 the flip-flop 37 is set to give an inhibiting control to the gates 38, 38*a*. Thus if the data on both channels agrees, then it is assumed correct, and even if the Hamming check indicates an error no correction is allowed. If the two channels disagree, then at least one of them will have an incorrect Hamming check and the necessary operation at the appropriate destination is allowed. It will be seen that duplication only is adequate throughout, with the addition of the small amount of redundant comparison equipment just described.

Methods are already established using shift registers with associated feed-back paths for the generation of parity check bits. "Error correcting codes" by Peterson, W. W. Wiley, 1961, Chapter 8 describes encoding and error-correcting arrangements suitable for use with Hamming codes. (2) These involve recycling the data to determine which bit is in error and are useful where time can be allowed for this to be done. Where immediate correction is required the following method can be used. FIGURE 4 shows a serial coding circuit for three check bits in which the incoming data is selectively routed to one of a number of counting flip-flops 40, 41, 42, one for each parity checking channel, by means of a set of AND-gates 43, 44, 45. These form the module two sum of the appropriate bits. When this is complete, a second set of AND-gates 46, 47, 48 allows the pattern of check bits to be formed into a sequence in synchronism with the check bits already associated with the number being transferred. For $k$ check bits, the equipment required amounts to 1 $k$-input OR-gate
$2k$, 2-input AND-gates
$k$ flip-flops FIGURE 5 shows a comparison circuit in which the output of the serial coding circuit and the existing check bits are combined in a not-equivalent gate 50. The output, which indicates those bits in the two check patterns which differ, is distributed to a set of flip-flops 51, 52, 53, one for each check digit place. These store the pattern of differing check bits until the transfer is complete and the correction can be made.

For $k$ check bits the following equipment is required.

1 not-equivalent circuit
$k$ 2-input AND-gates
$k$ flip-flops

With the Hamming code, the pattern of differing check bits indicate, in a binary coding, the position of any faulty bit in the transferred word. This binary combination has to be decoded into a one-out-of-$n$ form before access can be gained to the bit requiring correction. The form of such decoders is well known and for an input of $k$ check bits results in $2^k$ output combinations. The circuit can be realised with $2^k$ $k$-input AND-gates.

An estimate can now be made of the amount of extra equipment required for the transfer arrangements described. It is assumed that the sources and destinations are flip-flop shift registers with two unsophisticated flip-flops for each bit and very simple two-phase transfer circuits. Weighting is given to the circuits according to the approximate number of components used, allowing for some regeneration of power between gating levels, as follows:

$n$-input AND-gate—$(n+1)$
$n$-input OR-gate—$(n+1)+3$
flip-flop 20
not-equivalent gate 13

These weightings may vary widely with the circuit techniques available and are only intended to indicate the order of extra complexity involved.

The use of two channels each with its own associated error correcting digits has now been shown to be attractive as a means of protecting serial transfer. To avoid code conversion, it is desirable that the same approach is used throughout the equipment. An adder capable of summing two serial binary numbers with Hamming code check bits produces the check bits proper to the sum. If this adder is not redundant, any fault within it causes errors in the output. Furthermore, a fault may destroy the relationship between the check digits and the numerical digits so that the use of the check digits is limited to verifying that the addition has been performed correctly. Correction of the sum is not possible.

A schematic diagram of a possible correction system for serial arithmetic is shown in FIGURE 6. The addend and augend are fed to the two adders 60, 61, along duplicate channels 62, 63 from the duplicate sources, 64, 65, each adder being fed with a channel from both the addend and augend so that a failure of an augend or addend channel does not prejudice correct operation. The result, including check bits for the sum formed within the adders, is fed to a cleared destination (not shown). Whilst this transfer is taking place, new check bits are formed in the coders 66, 67 corresponding to the check digits proper to the numerical part of the result (i.e. excluding the check bits appearing at the adder output). These are compared in the comparison circuits **68, 68*a*** with the check bits as they appear at each adder output and note taken of any disagreement. If a disagreement is recorded by a check circuit then one of two situations must have arisen, (a) the adder is faulty, or
(b) the check circuit is faulty.

If an adder is faulty, a correction cycle is needed in which the resulting data in one destination must be erased and replaced by the data from the other. As proposed for the similar case during transfer, this can be done during an extra special transfer cycle with little increase in equipment: if speed is vital, then cross-transfer arrangements can be built into the two destination storage devices. If the check circuit is faulty, then indicates that data must be erased and replaced in the destination when, in fact, this is not necessary. Since no attempt is being made to correct the sums by means of the check bits, there is no danger of corrupting the data due to a faulty check circuit and the unnecessary correction cycles can, perhaps, be tolerated in these cases. If not, then a not-equivalent circuit 69, as described for data transfer, can be used to inhibit any correction cycle when both results agree.

For the correction of data corrupted by any single fault in a serial system, a minimum of two channels is required.

The use of an error-correcting code of the Hamming type to check identical data on two channels gives protection during transfer against at least one fault, and sometimes more, whilst using less equipment than the well-known triplication schemes.

Protection against any single fault in addition can be achieved by the same type of coding with less equipment than triplication schemes.

In an equipment operating in the parallel mode, each bit effectively has its own serial channel. However, unlike the serial case many parallel channels are normally available, and it is practicable to apply a Hamming check cross them such that a fault occurring in any one can be detected and corrected.

To avoid the extra time required to check the contents of a destination for correctness after the completion of a transfer it appears preferable to check and correct any faults in the data source and in the transfer operation whilst the data flowing and to wait until the destination itself becomes a source before correcting any faults within it.

If a fault occurs in the checking circuits it may have one of the following results:

(a) the transfer is correct,
(b) a correct transfer is shown as being incorrect, or
(c) an incorrect transfer is shown as being correct.

Only cases (b) and (c) need be considered further. Case (c) necessarily implies two faults being present, one in the check circuit and one in the transfer circuit and is not pursued since the present discussion is concerned with single errors only. The effect of a fault of type (b) will be to cause lack of correspondence between the check and numerical parts of a word, an unnecessary correction having been applied. This could be avoided by making the checking, comparison and correction logic redundant. However, not all false corrections are disastrous: the alteration of the numerical part of a word without interference with the checking part is put right upon the next transfer of the word and could be tolerated. Furthermore, the number of times the numerical part of words are falsely corrected will be greater than the number of false corrections of the checking part, since the numerical bits will normally outnumber the checking bits. False correction of checking bits is, on the other hand disastrous since the true data is destroyed at the next transfer. It is this latter situation which must be avoided, and a means found of preventing the correction operation when the transferred data itself is correct.

A single parity bit giving a parity check of the complete word is adequate for this purpose and is much simpler than making the complete checking and correction logic redundant. Furthermore, the parity check can be used to decide whether or not any correction is necessary since it has the property of detecting any single error.

The possible effect of the single failure being in this parity checking circuit has now to be considered. If the failure occurs there, then the transfer and the Hamming checking and correction circuits are assumed to be fault free, and no correction signals are present. Any false indication from the parity check circuit does not therefore, introduce any error.

FIGURE 7 shows the arrangement in schematic form. The incoming data is received from a source 70 and comprises numerical digits $n$, Hamming check digits $k$ and a single parity bit $p$. The sequence of operations is:

(a) form the parity of the transferred data in the circuit 71 and simultaneously form the check code of the numerical part in the coder 72.
(b) compare the formed and transferred parities in the comparison circuit 73: if they agree, take no further action, if they disagree, proceed to
(c) compare the formed and transferred check digits in the comparison circuit 74 and make any necessary corrections, by decoding the result in the decoder 75, and
(d) reform the parity bit from the corrected data and replace the transferred parity bit by the new one in the second store 76.

The various fault conditions which can arise and the resulting operation of the circuit are as follows:

(a) all bits correct; the parity check agrees with the parity bit and the correction circuit is inhibited without effect, (b) a fault in the source or in the transfer operation, (i) parity bit correct, the parity check and the parity bit disagree and the correction circuit corrects the faulty bit, (ii) parity bit incorrect, the parity check and the parity bit disagree and the correction circuit is disabled, (c) a fault in the check circuit; (the transferred data is all correct)

(i) the parity bit and parity check agree; the correction circuit is disabled to prevent any false correction of the data, (ii) the parity bit and parity check disagree; the correction is enabled but there is no output from the comparison circuit.

In order to form a new check digit code combination and the parity bit from the transferred numerical data, it is necessary to sum modulo two, specified groups of digits. FIGURE 8 shows a method of doing this in which the selected digits in each group $n$ are dynamicised in delay lines 80, and fed to counter flip-flops 81, 82, 83 to form their modulo two sum. The results are subsequently gated out to the comparison circuit. For $k$ check bits and $n$ numerical bits the equipment required amounts approximately to:

$k$ flip-flops
$k$ 2-input AND-gates
$k+4n$ 2-input OR-gates
$4n$ delay stages.

The comparison circuit is required to indicate when a corresponding pair of check digits disagree, and this requirements is satisfied by a not-equivalent circuit 90, 91, 92 shown in FIG. 9. The comparison of the parity bits, on the other hand, requires an output when they agree and an exclusive-OR circuit 93 is needed.

The AND-gates 94, 95, 96 which inhibit any Hamming check differences which the parity check agrees with the transferred parity require built-in redundancy for full protection of the system.

For $k$ check bits, the equipment requires amounts to:

$k$ 2-input AND-gates (redundant)
$k$ not-equivalent gates
1 exclusive-OR gate

The pattern of differing check bits, with the Hamming code, indicate in binary form the position in the word of any erroneous bit. The necessary decording to one-out-of-$n$ form requires $2^k$ $k$-input AND-gates.

The basic requirement for addition is to sum two numbers, with their associated check bits, and to produce a result in which the check bits are those appropriate to the correct sum. It is possible to design a parallel adder to provide this result, one being described below with reference to FIG. 10. Since the carry signals from individual stages are used to assist in the formation of the check digit combination appropriate to the sum, any fault which results in an incorrect carry signal will cause errors in both the numerical sum and the check digits. At best, therefore, the check bits can only provide error detection in the addition of two checked numbers.

Some additional redundancy must be included if error-correction is required. This could be in the form of a more complex coding of the data, or as replication of appropriate parts of the adder with voting. It has not proved possible, so far, to discover a suitable code for error-correction of an addition process, and attention has been diverted to methods of replicating parts of the adder.

Since multiple errors may occur in the complete sum word due to a single fault, it appears necessary to at least duplicate the whole adder. The situation is very similar to the serial case described above where a single fault can effect all the digits in a word.

There are three possible causes of errors:

(a) the data from the source was in error,
(b) an adder stage is faulty, or
(c) the check circuit is faulty.

There is no means of correcting a fault of type (a) once the sum has been formed and steps must be taken to check the validity of the data before it enters the adder. This can be done by several methods, including:

(i) transferring the data away from the source and back again; if no error is detected, it could be assumed that the data is error-free, (ii) applying a simple parity check: if no error is indicated the addition can proceed, and (iii) having a complete error correcting circuit between the two sources and the adder.

Methods (i) and (ii) do not provide correction of errors. If the source itself is faulty then even if the data is corrected it will become erroneous again due to the fault. One way of overcoming this difficulty is to transfer the data away to a fault-free source and to amend the addressing accordingly. Another is to complement the data on the assumption that any previously incorrectly set stage would then be in the correct binary state, and to complement the output from the other source as well as the adder output so as to maintain the correct sum. This point will arise in the design of a complete arithmetic unit. Meanwhile, it is assumed that error-free data is applied to the adder and that only faults of type (b) or (c) will occur.

FIGURE 10 shows a scheme in which the addend and augend are fed to two parallel adders 100, 101. The output of these are connected to checking circuits 102, 103 which inhibit the output from the associated adder if the check and numerical parts of the word are incompatible. Assuming that only one adder is faulty at any given time, this arrangement gives adequate protection. If a check circuit is faulty then two situations can arise:

(1) correct data is indicated as being incorrect, and
(2) incorrect data is indicated as being correct. The first of these is acceptable since no corruption of the data can occur. The second, on the other hand could cause trouble, but necessarily implies the presence of two faults and is not considered further at present.

The scheme will protect parallel addition, therefore, against a single fault in the equipment.

What I claim is:

1. In data processing equipment including means for transferring data together with associated error detection and correction information from a source to a destination, said transfer means having means for internally generating error detecting and correcting information relating to the data, means for comparing the internally generated error detection and correction information with that received from the source, and further separate data checking means arranged to control the correcting, if any, of the data transferred to the destination in the event of there being a discrepancy between the error detection and correction information received from the source and the internally generated error detection and correction information, the improvement comprising:

the incoming data comprises numerical digits $n$, check digits $k$, and a single parity bit $p$;

means coupled to receive and to form the parity of the transferred data;

a coder of the transferred data to simultaneously form the check code of the numerical part;

means to compare the formed and transferred parities in a parity comparison circuit, so that on agreement an inhibiting function is initiated;

means to compare, if no inhibit function is initiated, the formed and transferred check digits in a check digit comparison circuit and to make the corrections by decoding the result in a following decoder; and means coupled to reform the parity bit from the corrected data and to replace the transferred parity bit by a new one in a store destination.

2. The equipment of claim 1, wherein said coder includes delay line means coupled to the selected digits in each group *n*, the output of which is coupled to a plurality of counter flip-flops to form the modulo two sum, and the results are subsequently gated out to said check digit comparison circuit.

3. The equipment of claim 2, wherein said check digit comparison circuit includes a plurality of not-equivalent circuits to indicate when a corresponding pair of check digits do not agree and said parity circuit includes an exclusive-OR circuit for comparing the parities and producing an output when they agree, and wherein a plurality of AND-gates are coupled to inhibit any check differences when the parity check agrees with the transferred parity.

References Cited

UNITED STATES PATENTS

| | | | |
|---|---|---|---|
| Re. 23,601 | 12/1952 | Hamming et al. | 177—353 |
| 2,848,532 | 8/1958 | Weida. | |
| 2,910,235 | 10/1959 | Southard. | |
| 2,950,464 | 8/1960 | Hinton et al. | |
| 3,124,783 | 3/1964 | Adams | 340—146.1 |
| 3,222,643 | 12/1965 | Klinkhamer | 235—153 X |

MALCOLM A. MORRISON, Primary Examiner

R. S. DILDINE, Jr., Assistant Examiner

U.S. Cl. X.R.

235—153